though not technically necessary are conveniently located in a pair of flexible rubber or plastic tubes according to the invention,

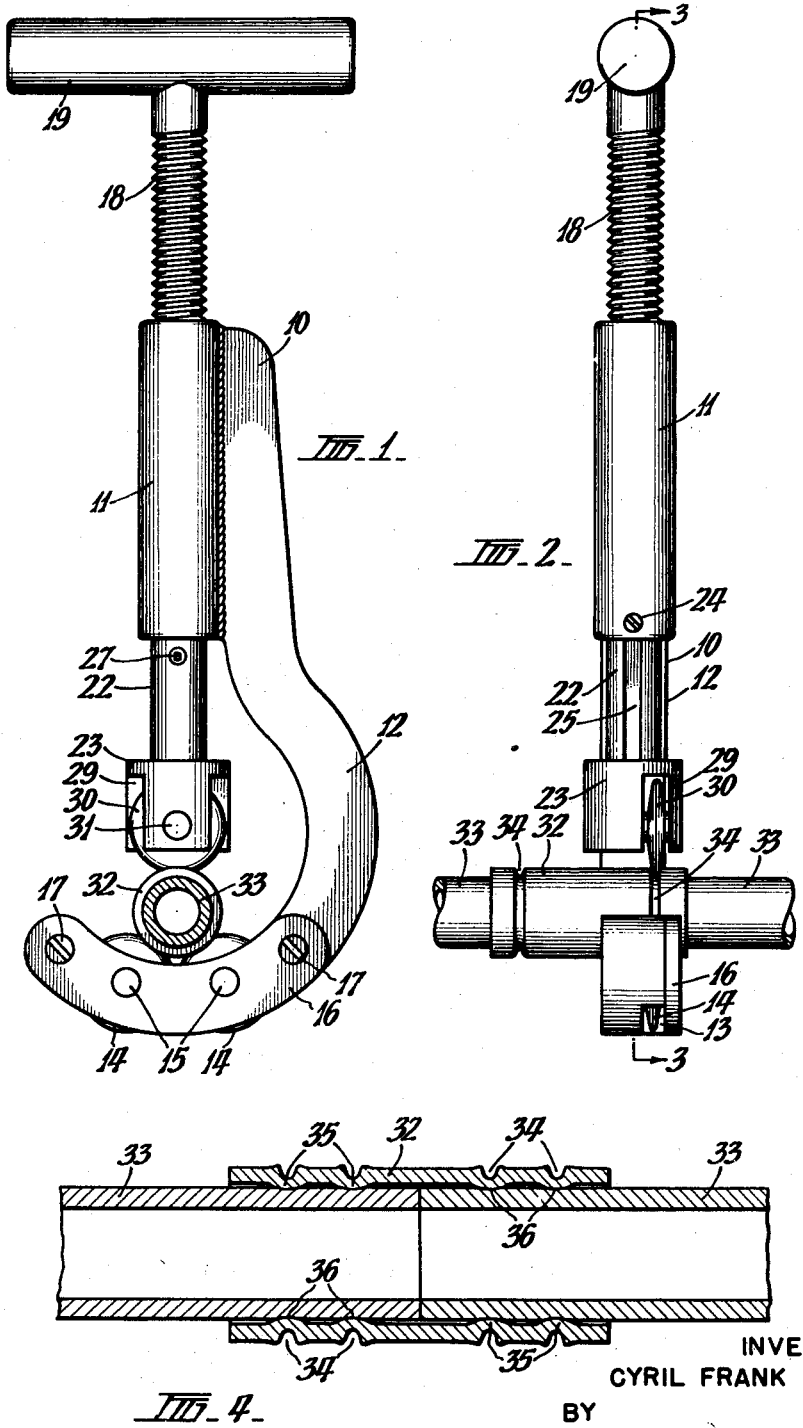

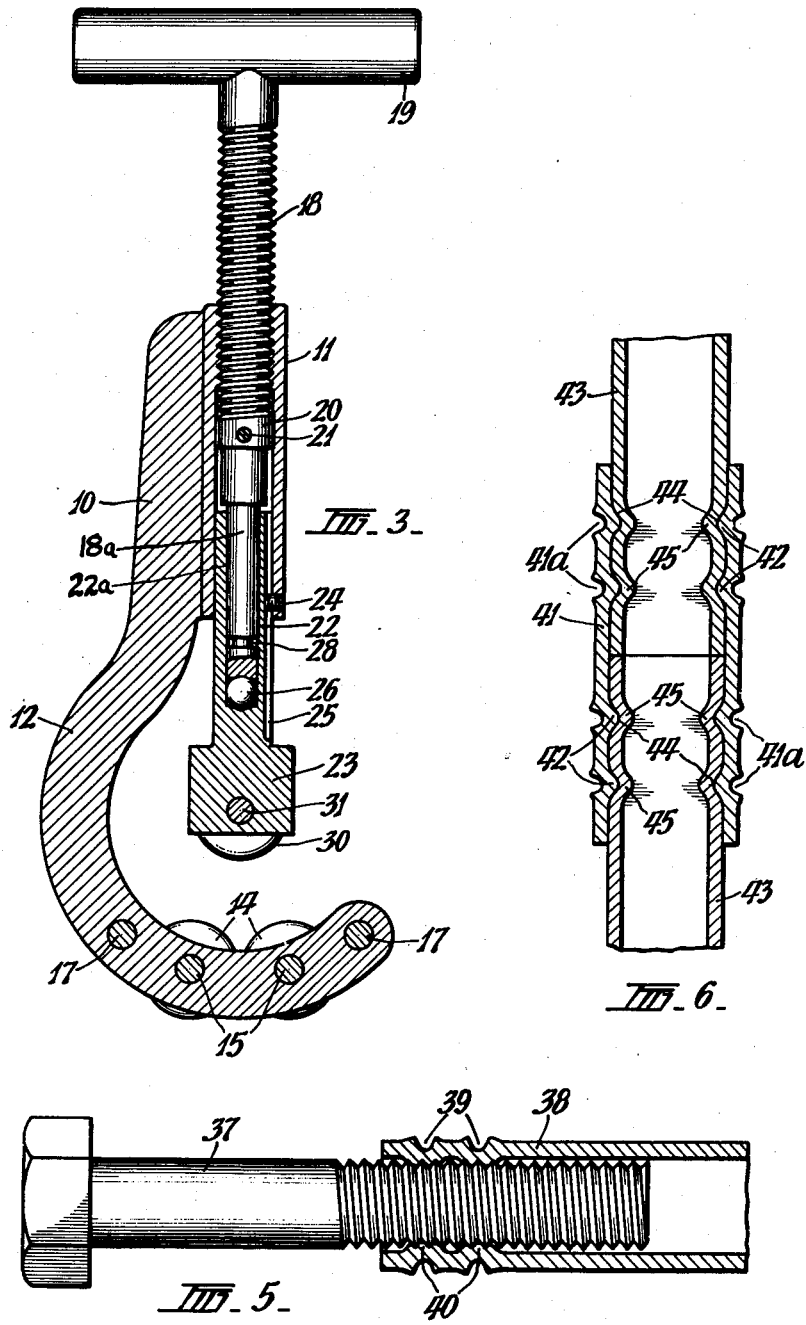

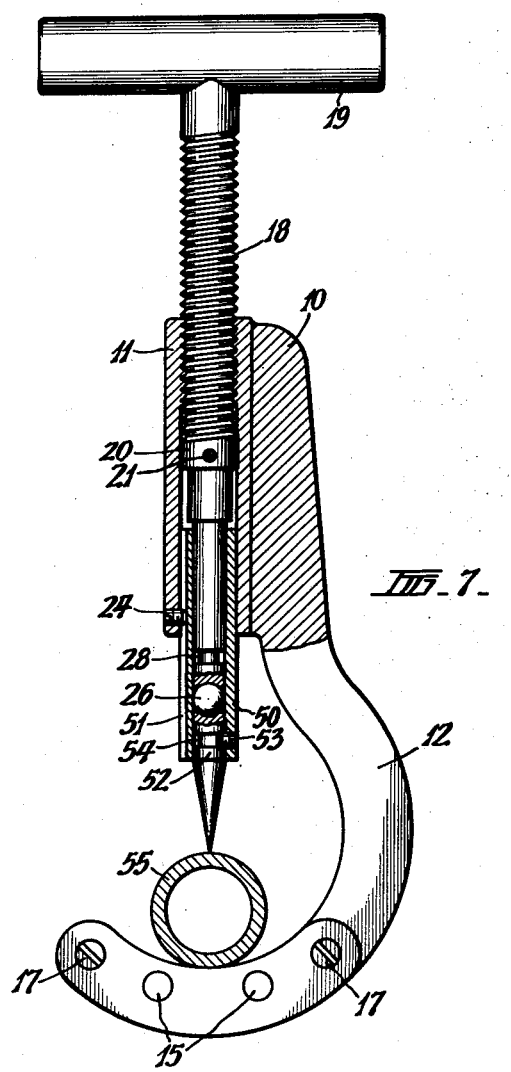
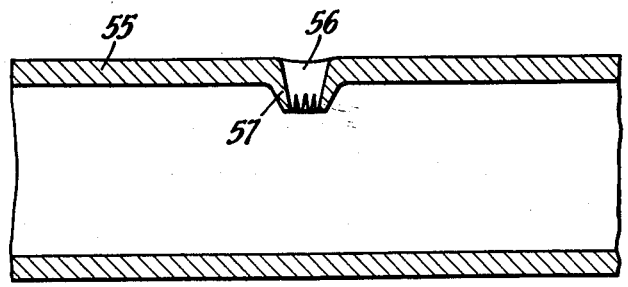

United States Patent Office

2,948,170
APPARATUS FOR MAKING A JOINT BETWEEN A METAL TUBE AND AN OBJECT ENGAGEABLE THEREIN

Cyril Frank Kemp, Willmington St., Ayr, Queensland, Australia

Filed Sept. 4, 1957, Ser. No. 682,038

Claims priority, application Australia Sept. 4, 1956

5 Claims. (Cl. 81—15)

This invention relates to an improved apparatus for making a joint between a metal tube and an object engageable therein.

The making of a strong and durable joint between a metal tube and a further tube or another object such as a round-section rod, requires the exercise of a considerable degree of skill, and also takes a considerable time, whether the parts to be joined are first threaded and then engaged threadedly with each other, or are welded together, the difficulties in the latter case being, of course a good deal greater than in the case of a threaded joint.

Difficulties are also experienced in making satisfactory joints between tubular connector pieces and flexible plastic tube, such as is used extensively for water piping, in order to connect together the ends of plastic pipes or tubes by means of the connector piece.

One of the principal objects of the present invention is to provide a novel and improved tool for making, quickly and easily a firm and durable joint between a metal tube and an object, such as a further tube, or a bar, engaged within the said metal tube. Another main object of the invention is to provide a tool, simple and economical to manufacture, for making such a joint.

With the foregoing and other objects in view, the invention resides broadly in a tool for making a joint between a metal outer tube and an object, such as a further metal or other deformable tube, or a metal or other rod, engaged therein which enables forming about the outer metal tube an annular indentation, so that metal thus displaced forms within the outer tube a male annulus engaging and securing the enclosed object; and apparatus including a frame, rotatable follower rolling wheels mounted on the frame, a rotatable thrust rolling wheel mounted on the frame, the follower and thrust rolling wheels being such that a metal tube may be engaged between them, and means for moving the thrust rolling wheel towards the follower rolling wheels to exert pressure on the engaged outer tube, the follower and thrust rolling wheels being adapted when the frame is oscillated about the engaged metal outer tube, to press an annular indentation into the said engaged metal pipe. Other features of the invention will become apparent from the following description.

In order that the invention may be readily understood and put into practical effect, reference is now made to the accompanying drawings, wherein:

Fig. 1 is a side elevational view of a tool according to the invention, shown making a sleeve joint on a pair of tubes, Fig. 2 is a front elevational view of the tool shown in Fig. 1, Fig. 3 is a sectional view along line 3—3 in Fig. 2, Fig. 4 is a sectional view of a sleeve joint formed on a pair of metal tubes according to the invention, Fig. 5 is a sectional view of a threaded joint of a pipe on a bolt according to the invention, Fig. 6 is a sectional view of a sleeve joint formed on a pair of flexible rubber or plastic tubes according to the invention, Fig. 7 is a partly sectioned side elevational view of a tool according to the invention, the rolling wheels being removed and a tube piercing instrument being installed, and Fig. 8 is a sectional view, to enlarged scale, of a tube pierced by the piercing instrument.

The tool shown in the drawings has a frame 10 including a sleeve 11 which is axially bored, the upper part of its bore being somewhat reduced in diameter and tapped. Welded longitudinally to the sleeve is the upper part of a mounting bracket 12, consisting of a steel bar, more or less square in cross-section, the lower part of which is shaped to hook-like form, the greater part of this hook-like portion being substantially in the form of an arc or semi-circle of which the centre lies on a prolongation of the axis of the frame sleeve 11.

In the lower part of the mounting bracket 12 there are formed from one side thereof two slots 13, one of which is shown in Fig. 2, to accommodate fairly closely the greater parts of a pair of follower rolling wheels 14. These follower rolling wheels are rotatably mounted on axis pins 15 secured in appropriate holes in the mounting bracket 12 and in corresponding holes in an arcuate retaining plate 16 secured by screws 17 to the lower part of the mounting bracket 12.

Engaged in the tapped upper part of the bore of the frame sleeve 11 is the threaded upper portion of a spindle 18, the upper end of which is welded perpendicularly to the middle part of a handle 19.

On the spindle 18, below its threaded upper part, a stabilizing collar 20 is secured by a set screw 21, this collar engaging closely but rotatably within the lower plain part of the bore of the frame sleeve 11.

The lower part of the spindle 18, below the stabilizing collar 20, is reduced in diameter as at 18a, and is engaged closely but rotatably in an axial aperture 22a formed from the upper end of the stem 22 of a thrust wheel carrier 23. The thrust wheel carrier 23 is of generally cylindrical shape, and its stem 22, which is formed integrally therewith, is coaxial with the said carrier and engages closely but slidably within the lower part of the bore of the frame sleeve 11. A grub screw 24 engaged in a tapped radial aperture in the lower part of the frame sleeve 11 engages in a longitudinal keyway 25 formed in the front part of the thrust wheel carrier stem 22 to restrain the thrust wheel carrier and its stem against rotation.

Between the bottom of the spindle 18 and the bottom of the axial aperture in the thrust wheel carrier stem 22 there is positioned a thrust bearing ball 26, seating in recesses in the bottom of the said aperture and in the bottom of the said spindle.

A pair of opposed grub screws 27 engaged in a pair of opposed radial tapped holes in the thrust wheel carrier stem 22 engage an annular recess 28 about the reduced lower part of the spindle 18, to prevent the thrust wheel carrier and its stem from being withdrawn from the spindle 18.

The thrust wheel carrier 23 has formed from its lower end a chordal slot 29, and between the so divided parts of the said carrier a thrust rolling wheel 30 is rotatably mounted upon an axis pin 31 secured in a diametral hole through the lower part of the thrust wheel carrier. The thrust rolling wheel 30 and the two follower rolling wheels 14 are so disposed that a plane parallel to the side faces of the mounting bracket 12 and parallel to and to one side of the axis of the frame sleeve 11 passes centrally through the three rolling wheels, perpendicular to their axes. The said three rolling wheels are of similar construction, each tapering to a rounded periphery.

In using the tool to form a sleeve joint to connect together a pair of metal tubes, a joint sleeve 32, which may be of galvanized iron, is fitted over the abutting ends of the two tubes 33 to be joined, and which may also be of galvanized iron.

The tool is engaged with the joint sleeve 32, fairly near to one end of the said sleeve, by bringing the tool into such position that the follower rolling wheels engage the sleeve to one side and, by turning the spindle handle 19, the thrust rolling wheel 30 is brought into contact with the other side of the joint sleeve. The spindle handle 19 is turned further to force the three rolling wheels into firm engagement with the joint sleeve 32, and the tool is rocked or oscillated about the joint sleeve through an angle of approximately two hundred degrees. In this way, a small identation will form in an arc about the sleeve. A lubricant is then added, and the tool is swung completely about the joint sleeve. The spindle handle 19 is further tightened, and the tool is moved about the joint sleeve to deepen the annular indentation being formed; and this procedure is continued, lubricant being added as required, until an annular indentation of some considerable depth is formed about the joint sleeve, as indicated at 34 in Figs. 2 and 4. The tool is then released from the joint sleeve by counter-rotating the spindle handle 19, and the procedure, as described, is repeated near to the other end of the joint sleeve, as indicated in Fig. 2. To make a particularly firm and watertight joint, two further annular indentations or recesses 34 are formed in like manner about the joint sleeve, somewhat nearer to the abutment of the two tubes 33, as indicated in Fig. 4.

It is found that, when an annular indentation or recess 34 is formed about the joint sleeve in this manner, displaced metal forms a male annulus within the joint sleeve 32, as indicated at 35 in Fig. 4. Such a male annulus 35, meeting the resistance of the enclosed tube 33, forces a shallow female annulus 36 in the tube 33, but it is found that the bore of the tube 33 is almost unaffected, and is not restricted to any appreciable extent. Each male annulus 35 within the joint sleeve 32 furthermore, opposed by the resistance of a tube 33, becomes rather extended as to axial length and so makes a very firm connection with the tube 33 over a considerable area.

It will be appreciated that a joint or connection of two solid rods may be made in like manner by abutting the ends of the rods within a fairly closely fitting joint sleeve; and it will be apparent that two metal tubes of such diameters that an end of one may be closely fitted within an end of the other may be connected together by rolling annular recesses or indentations about the outer tube end by means of the tool. Again, a firm connection may be made between an end of a tube and an end of a solid rod closely fitted into the tube and, as shown in Fig. 5, a threaded joint may be made between an end of a tube and a bolt or other externally threaded element fairly closely inserted into the tube. In Fig. 5, a bolt 37 is inserted into an end of a tube 38 and, in the manner above described, two annular indentations or recesses 39 are formed about the tube 38, displaced metal forming with the tube 38 two male annuli 40 which, meeting the resistance of the threaded bolt 37, become axially extended and also are forced between threads of the bolt 37. The bolt 37 may, by means of a suitable tool, be unscrewed from the internal threads thus formed in the tube 37.

In making a joint between two lengths of rubber, plastic or like flexible tube, the procedure as described above with reference to Fig. 4 for making a sleeve joint for two metal tubes is followed, but as shown in Fig. 6 the metal joint sleeve 41, when annular recesses or indentations 41a are formed thereabout by the tool, develops male annuli 42 within it which, meeting relatively little resistance from the enclosed abutting rubber or plastic tubes 43, are fairly rounded and not axially extended, and these male annuli press in the flexible tubes 43 corresponding female annuli 44, resulting in the formation, within the bores of the tubes 43, of corresponding annular restrictions 45. A joint of this nature, which may be made quickly and easily, will be found to be very effective in withstanding very considerable pressures.

The off-set arrangement of the follower and thrust rolling wheels 14 and 30 of the tool will be found to be very advantageous when it is required to roll an annular indentation or recess about a metal tube close to some obstruction; and an incidental advantage is that the axis pin 31 of the thrust rolling wheel 30, when it becomes worn, may be removed and replaced in reversed position.

By slackening the two grub screws 27, the stem 22, with the thrust wheel carrier 23 and the thrust rolling wheel 30 may be removed, and, as shown in Fig. 7, these parts may be replaced by a tubular stem 50, formed with a keyway 51 engaged by the grub screw 24, a pair of grub screws (not shown) similar to the grub screws 27 and in opposed tapped apertures in the stem 50 being screwed into engagement in the annular recess 28 about the lower part of the spindle 18. The bearing ball 26 now rests in a recess in the upper end of a piercing instrument 52, the upper part of which is engaged closely within the lower part of the tubular stem 50 and is retained in place by a grub screw 53 engaged in a tapped aperture in the lower part of the said stem and extending into an annular recess 54 about the upper part of the piercing instrument 52. Below the stem 50, the piercing instrument tapers to a fine point, its sides having a slight inward curve.

The follower rolling wheels 14 are removed, and a tube 55 to be pierced is supported upon the lower part of the mounting bracket 12 directly below the piercing instrument 52. By rotating the handle 19 in one direction, the piercing instrument 52 may be caused to descend to form a tapered radial hole 56 in the tube 55, displaced metal forming an annular flange 57 within the tube 55, as shown in Fig. 8. Nails may be driven into such holes, or self-tapping screws may be driven into them. Again, if a series of such holes are formed in a pipe, they may serve as jets of an irrigation spray system, for example.

The means for making joints according to the invention will be found to be very effective in achieving the objects for which the invention has been devised. It will be understood, of course, that the particular embodiment of tool herein described and illustrated may be subject to many minor modifications of constructional detail and design without departing from the ambit of the invention.

What I claim is:

1. A joining tool for making a joint between a metal tube and an object engaged therein including a frame sleeve, a mounting bracket secured to and having its lower portion below the frame sleeve, a spindle threadedly engaged in the frame sleeve, two detachable follower rolling wheels mounted rotatably in the lower part of the mounting bracket, their axes being subsantially parallel and spaced equidistantly to opposite sides of a downward prolongation of the axis of the spindle, a stem slidably engaged in the lower part of the frame sleeve, means for restraining the stem against rotation, said stem having an axial aperture in the upper part thereof to receive the lower part of the spindle, means for restraining the stem against longitudinal movement relative to the spindle, a handle on the upper end of the spindle, a thrust rolling wheel carrier at the lower end of the stem, and a thrust rolling wheel rotatably mounted in the thrust rolling wheel carrier, the follower and thrust rolling wheels being such that a plane passing centrally through them perpendicular to their parallel axes is off-set to one side of the axis of the stem, said stem being detachable from the spindle and replaceable by a stem having a tube piercing tool rotatably mounted at its lower end and tapering downwardly to a point.

2. A joining tool for making a joint between a tube and an object engaged therein including a frame, a rotatable spindle threadedly engaged with the frame and terminating in an unthreaded extension, a stem mounted on the frame for longitudinal sliding engagment therewith, said stem telescopically receiving the unthreaded extension of the spindle, anti-friction means stationed between said extension and stem to permit the relative rotation of the spindle with respect to the stem, said stem having a longitudinally disposed keyway, key means on the frame engaging said keyway to prevent rotation of the stem, means to lock said stem and spindle against relative longitudinal movement, said stem terminating in a rotatably mounted thrust rolling wheel, rotatable follower rolling wheels mounted on the frame, the follower and thrust rolling wheels being spaced and superposed in a common plane such that the tube may be engaged therebetween, the follower and thrust rolling wheels being adapted, when the frame is rotated about the engaged tube, to press an annular indentation into said engaged tube.

3. A joining tool for making a joint between a tube and an object engaged therein including a frame, a sleeve carried by the frame, a rotatable spindle threadedly engaged in the sleeve and terminating in a smooth unthreaded extension, a stem disposed in the sleeve for longitudinal sliding engagement therewith and having an axial aperture to receive therein the unthreaded extension of the spindle, ball bearing means in such axial aperture to contact said spindle and permit relative rotation of the spindle with respect to the stem, said stem having a longitudinally disposed keyway, set screw means extending radially through said sleeve to engage the keyway and prevent rotation of the stem with respect to the sleeve, additional set screw means locking said stem and spindle against relative longitudinal movement, said additional set screw means being releasable whereby said stem is easily removed from the tool without interference from the other defined parts, said stem terminating in a rotatably mounted thrust rolling wheel, a mounting bracket secured to the frame and having its lower portion below said sleeve, two follower rolling wheels rotatably mounted in said lower portion of the mounting bracket, the follower and thrust rolling wheels being adapted, when the frame is rotated about the engaged tube, to press an annular indentation into the engaged tube.

4. The joining tool of claim 3 wherein the follower rolling wheels are detachable, and the stem is detachable from the spindle and replaceable by a stem having a tube piercing tool rotatably mounted in its lower end and tapering downwardly to a point.

5. A joining tool for making a joint between a metal tube and an object engaged therein including a frame, a sleeve carried by the frame and having an internally threaded portion at one end and an internally smooth-surfaced portion of larger internal diameter at the other end, a rotatable spindle threadedly engaged with the internally threaded portion of said sleeve and terminating in a smooth-surfaced unthreaded extension, a collar fixed to said unthreaded extension and engageable with the smooth-surfaced portion of the sleeve to stabilize movement of the spindle therethrough, a stem disposed within the sleeve for longitudinal sliding engagement with said smooth-surfaced portion thereof, said stem having an axial aperture telescopically to receive therein the unthreaded extension of the spindle, a ball bearing seated between the end of said unthreaded extension and a bottom of such axial aperture to permit relative rotation of the spindle with respect to the stem, said stem having a longitudinally disposed keyway, set screw means extending radially through said sleeve to engage the keyway and prevent rotation of the stem with respect to the sleeve, said extension of the spindle having a peripheral annular recess, additional set screw means extending radially through said stem to engage the recess and lock said extension and stem against relative longitudinal movement, said additional set screw means being releasable whereby said stem is easily removed from the tool without interference from the other defined parts, said stem terminating in a rotatably mounted thrust rolling wheel, a mounting bracket secured to the frame and having its lower portion below said sleeve, two follower rolling wheels mounted rotatably in said lower portion of the mounting bracket, the axes of said rolling wheels being substantially parallel and means to rotate the spindle about a longitudinal axis, the follower and thrust rolling wheels being adapted, when the frame is rotated about the engaged metal tube, to press an annular indentation into said engaged metal tube.

References Cited in the file of this patent

UNITED STATES PATENTS

| Number | Name | Date |
|---|---|---|
| 575,685 | Brockett | Jan. 26, 1897 |
| 660,584 | Norman | Oct. 30, 1900 |
| 708,790 | Winn | Sept. 9, 1902 |
| 963,729 | Barnes | July 5, 1910 |
| 1,376,936 | Hermistone | May 3, 1921 |
| 2,085,710 | Tornblom et al. | June 29, 1937 |
| 2,131,766 | Temple | Oct. 4, 1938 |
| 2,192,914 | Ice | Mar. 12, 1940 |
| 2,337,362 | Willinger | Dec. 21, 1943 |
| 2,367,206 | David | Jan. 16, 1945 |
| 2,453,126 | Forcier | Nov. 9, 1948 |
| 2,706,924 | Crew | Apr. 26, 1955 |
| 2,813,442 | Wongate | Nov. 19, 1957 |

FOREIGN PATENTS

| Number | Country | Date |
|---|---|---|
| 140,935 | Great Britain | Apr. 8, 1920 |
| 523,810 | France | Apr. 29, 1921 |